United States Patent [19]

Wilheim

[11] Patent Number: 5,331,505
[45] Date of Patent: Jul. 19, 1994

[54] MULTI-COPLANAR CAPACITOR FOR ELECTRICAL CONNECTOR

[75] Inventor: Timothy J. Wilheim, Peoria, Ariz.

[73] Assignee: Honeywell Inc., Minneapolis, Minn.

[21] Appl. No.: 2,296

[22] Filed: Jan. 8, 1993

[51] Int. Cl.$^5$ .......................... H01G 1/14; H03H 7/00
[52] U.S. Cl. ............................ 361/306.3; 361/301.4; 361/302; 361/328; 333/185; 439/607; 439/620
[58] Field of Search .................. 361/111, 301.2, 301.4, 361/303, 306.2, 306.3, 321.1, 321.2, 321.3, 328, 329, 330, 746, 750, 762, 816, 818, 302, 306.1, 311-313; 174/262, 266; 333/182, 184, 185; 439/607-610, 620

[56] References Cited

U.S. PATENT DOCUMENTS

| | | | |
|---|---|---|---|
| 4,328,530 | 5/1982 | Bajorek et al. | 361/762 |
| 4,580,866 | 4/1986 | Hagner | 439/620 |
| 4,726,790 | 2/1988 | Hadjis | 333/185 |
| 4,791,391 | 12/1988 | Linnell et al. | 333/182 |
| 5,066,931 | 11/1991 | Thelissen | 333/182 |
| 5,071,369 | 12/1991 | Denlinger et al. | 439/595 |
| 5,081,434 | 1/1992 | Sakamoto et al. | 333/182 |

Primary Examiner—Bruce A. Reynolds
Assistant Examiner—Gregory L. Mills
Attorney, Agent, or Firm—C. G. Mesereau; D. E. Jepsen; R. E. Champion

[57] ABSTRACT

A multi-coplanar, multi-layer capacitor array for use as an RFI filter associated with an electrical connector module having a pattern of pin and socket connections includes a multi-layer board structure of super imposed layers including ground plane layers and capacitor layers interleaved with one another. An array of apertures extend vertically through each of the layers forming a grid having a center-to-center spacing and pattern congruent with the apertures in the desired connector module and are configured to receive the conductor pins. The ground plane layers include a continuous conductive layer on top of a dielectric layer with clearance holes surrounding the apertures so as to be electrically insulated from the connector pins and the capacitors. The capacitor plane layers further include a plurality of defined coplanar individual separate capacitor areas encompassing a plurality of terminal pins but connected to one, the rest being provided with clearance holes, thereby associating each pin with an unique capacitive plane. The separate capacitors provide RFI filtering for the signals on each pin.

13 Claims, 2 Drawing Sheets

MULTI-COPLANAR CAPACITOR FOR ELECTRICAL CONNECTOR

BACKGROUND OF THE INVENTION

1. Cross-Reference to Related Applications

Cross reference is made to related U.S. patent applications Ser. Nos. 08/001995 of Mario DiMarco entitled "ELECTRICAL CONNECTOR INCORPORATING GROUND SHIELD SPACER", now U.S. Pat. No. 5,304,964, and 08/002297 of Mario DiMarco and the inventor in the present application entitled "ELECTRICAL CONNECTOR INCORPORATING EMI FILTER", now U.S. Pat. No. 5,268,810, both filed of even date and assigned to the same assignee as the present application. It will be recognized that the two cross-referenced applications represent the types of EMI suppression devices which are unique but which can be incorporated alone or with each other and possibly with the device of the present invention in association with an electrical connector to provide needed degrees of or more comprehensive isolation.

II. Field of the Invention

This invention relates generally to electrical connectors for connecting electrical devices or parts to a cable harness, and more particularly to a multi-coplanar capacitor system for use with connector assemblies incorporating elements with particular reference to effectively isolating input/output signal receiving or control devices with respect to the electrical assembly with which the connector is used from electromagnetic interference (EMI), radio frequency interference (RFI), and particularly frequencies into the microwave frequency range.

III. Discussion of the Prior Art

Present-day commercial and military aircraft incorporate highly complex electronic control systems incorporating numerous sensors, force transducers and servo systems as well as the electronics necessary for processing the sensor signals and developing the requisite control signals for the transducers and the like so that the aircraft can be flown in a controlled manner. Typically, the electronic assemblies involved will be housed in metallic shielding enclosures or boxes which are adapted to slide into equipment racks on the aircraft. Each of the electronic modules will typically incorporate a receptacle having a relatively large number of terminal pins arranged in a grid pattern and which are appropriately wired to the electronic componentry within the shielded enclosure. A plug member which is adapted to mate with the receptacle on the box housing the electronics module is incorporated into the rack assembly. The pins of the plug are typically connected to conductors in a wiring harness leading off to other electronic equipment which may be spread throughout the aircraft.

One standard plug used throughout the aircraft industry is referred to as the ARINC 600 plug, which meets the ARINC specifications for air transport avionics equipment interfaces. That specification, among other things, defines the number of pins, their location, the pin spacing and the shell dimensions for the plug. Those desiring more specific information relative to the plug are referred to the ARINC 600 specification itself.

The ARINC 600 plug is an example of a plug designed to mate with a receptacle attached to or formed into a wall of the shielding enclosure in which the electronics are contained. The ARINC 600 plug includes three sections with sections A and B incorporating 150 male pins, each disposed in a grid array of rows and columns. Section C includes a smaller number of pins which, generally speaking, provide the power connections to the electronics module. The existing receptacle, designed to accept the plug, includes a plurality of terminal pins having female sockets on one end and male wire wrap terminals or solder points on the other end. The pins are arranged in the same grid array, such that when the plug is inserted into the receptacle, the male pins of the plug engage the female sockets of the receptacle's terminal pins. The male portion of the receptacle's terminal pins then connect to the wiring for the electronics within the shielded enclosure.

One drawback of the prior art connectors generally and including the ARINC 600 connector design is that it does not provide the necessary immunity of the electronic circuitry from the effects of EMI and RFI and more particularly radiation in the microwave range. EMI/RFI radiation in proximity to the module may find its way into the interior of the shielded enclosure via the connector assembly. These RFI/EMI sources may result in the electronic controls issuing erroneous data to the other electronic equipment with which it is associated, resulting in loss of control over the aircraft.

While filtering and transient suppression circuits have been devised for dealing with RFI/EMI radiation, physical space constraints may preclude inclusion of such circuitry within the electronics module. A need, therefore, exists for a connector assembly which has an efficient high energy ground associated with a shield or filtering device which combines an efficient shield for the EMI/RFI frequencies of interest including those in the microwave range with an excellent chassis ground.

OBJECTS

It is accordingly a principal object of the present invention to provide improved EMI/RFI suppression associated with a connector receptacle assembly.

Another object of the invention is to provide an improved connector assembly which incorporates a multi-coplanar capacitor for limiting various forms of electromagnetic radiation from deleteriously affecting the operation of the control electronics.

Another object of the invention is to provide an improved EMI/RFI filter system for a receptacle containing a large plurality of terminal pins which will mate with an industry standard plug of interest and in which EMI/RFI in the microwave range are effectively filtered for each pin, by using an associated multi-coplanar capacitor where the connector receptacle will still fit in the space allocated for it on the electronics module.

A still further object of the invention is to provide a multi-coplanar capacitor using printed wire board materials associated with a connector receptacle of the class described which associates one capacitance plane with each connected terminal pin and uses two ground planes flanking each capacitor plane.

Yet another object of the invention is to provide MCC filtration that is external or internal to the plug of interest.

SUMMARY OF THE INVENTION

The present invention provides an integral EMI/RFI filter or suppression system which may be an integral part of a male or female connector or plug module and which solves many prior problems and achieves the foregoing features and objects including improved microwave interference rejection. This is accomplished by the provision of an improved RFI filter system for a connector which includes a multi-coplanar capacitor (MCC) system which can use printed wiring board materials and techniques to form a low-cost multi-layer system more flexible than a comparable ceramic capacitor and of a construction that allows it to be cut to any desired shape.

The system is characterized by small apertures between the front and back and small cell-size between capacitor plates to afford good microwave rejection. It further features a low impedance ground system. While the detailed embodiment is designed to be associated with an industry standard rectangular male plug, it is contemplated that a plug, male or female, of any shield configuration (shape) of the type having a plurality of pins or sockets arranged in a grid of rows and columns where the pins or sockets are electrically and mechanically joined to a multi-conductor wiring harness can be used. The connector generally is in the form of a conductive shell containing or mounted to the shielding and grounding components.

The shell of a connector used as a receptacle is typically rectangular or box-like but may be any other shape depending on the particular connector of interest. It generally defines a housing cavity with open front and rear faces dimensioned as to receive the aforementioned plug of interest when it is inserted through the open front face of the shell. The shell or housing of the connector or plug receptacle is made of conducting material and provided with a suitable substantial chassis ground and may be further plated where indicated to minimize corrosion during the life of the receptacle. The shell is generally provided with a movable frame proximate to its open rear face which supports a flat substrate containing a plurality of socket contacts arranged in the same grid pattern of rows and columns as is used for the male pins on the plug. The substrate also includes a plurality of terminal pins fitted into the socket contacts where the terminal pins project outwardly and rearwardly with respect to the shell thereby provide the points which directly connect to the printed wiring board construction of the multi-coplanar capacitor system of the invention. The rear portion of the connector housing or shell may be designed to be connected to a ground/shield/spacer module containing a further ferrite core or the like between the connector housing and the MCC of the present invention.

The MCC of the invention is preferably fabricated using printed wiring board (PWB) materials and techniques and can be as many layers thick as the process can accommodate, recognizing the general compromises between the PWB thickness, connector pin length and manufacturing environmental considerations with respect to a large number of laminar layers. One successful embodiment of the MCC/PWB of the invention included an equivalent of 32 layers.

The multi-coplanar capacitor is formed by placing a capacitor plane layer between two adjacent ground planes. The ground planes are solid metal planes that have clearance holes for the connector pins to pass through but not contact the ground planes. The capacitor planes are planes of defined individual, finite areas on and separated by a dielectric surface in which each such area functions as a separate individual capacitor. Although each individual finite area encompasses a plurality of terminal pins, preferably only one pin is connected to a given capacitor in a plane and clearance openings are provided for all the other pins in the area encompassed. Each of the other terminal pins is likewise connected to a different individual capacitor on another level in the multi-level system. In this manner, the use of plated through holes connects each connector pin to an unique capacitance plane area and each pin does not share a capacitance plane area with another pin. Each level, however, contains a plurality or array of spaced separate capacitance areas usually of similar or congruent shape.

The capacitors are formed by placing a dielectric capacitor plane layer containing several separate capacitor planes between two ground plane layers. The conductive ground planes extend all the way to the periphery of the dielectric material where they are all connected together across laminar edge boundaries about at least part of the periphery of the MCC/PWB to form a substantial ground connection to the multi-layer capacitor. In this manner, the ground is common to all the capacitors in the MCC and by using two ground planes for each capacitor plane, the capacitance is doubled over a similar size single ground plane. The use of a ground plane stack also serves to decrease stray coupling between the capacitors below and above any given capacitor.

In this manner, the MCC produces an individual capacitance for each terminal or connector pin with respect to the ground connection; although, if desired, multiple pins can be connected together. It is further clear that while the multi-coplanar capacitor of the preferred embodiment is presented as being external to the connector module, it will be appreciated that the connector shell could be compensated to accept the multi-coplanar capacitor as an integral and internal part of the connector module. Furthermore, the idea is considered universal to such connectors and it is believe that the technology utilized allows the MCC/PWB to be cut to any shape so that it would fit square, rectangular, circular or other shaped connector receptacle or any male/female arrangement.

The use of printed wiring board construction facilitates fabrication including the production of complex outlines at low cost. It produces a more flexible unit than those associated with ceramic capacitors of the same size. The system have been found to have excellent microwave rejection. Whereas there are many PWB dielectrics to choose from, considerations such as frequency response, expansion coefficient and cost are important. For example, cyanate esters appear to have excellent high frequency response, have low expansion coefficients and reasonable cost. There are many materials to choose from and the final application will generally determine the type of material used. Ground planes are preferably copper.

In this manner, the multi-coplanar capacitor provides a leadless high frequency capacitor filter designed to accommodate the pins of a compatible connector and to provide a low impedance, microwave frequency, grounding system. The MCC is designed to filter unwanted high frequencies from the terminal pins or connectors passing through the connection. The low pass filter action can be enhanced by using a thin block of ferrite or other core material between the incoming signal and the MCC; and, conversely, outgoing signal clarity can be enhanced by using a thin block of ferrite or other core material between the system output and the MCC. The combination of the alternating ground planes with the sandwich of smaller isolated capacitor planes in the MCC with the use the ferrite core modules surrounding the conductors allows the system to be tailored for any targeted frequencies of interest, generally between about 50 MHz and 5000 MHz.

The present invention then contemplates a feedthrough module which combines an EMI/RFI rejection and ground system in one module that can be associated with or included in a connector itself. The feedthrough module permits an industry standard plug, e.g., the ARINC 600 plug or any other plug or other type connector to be fit to a module.

BRIEF DESCRIPTION OF THE DRAWINGS

The foregoing features, objects and advantages of the invention will become apparent to those skilled in the art from the following detailed description of a representative embodiment especially when considered in conjunction with the accompanying drawing figures in which like numerals in the several views refer to corresponding parts.

DETAILED DESCRIPTION

Figure 1:
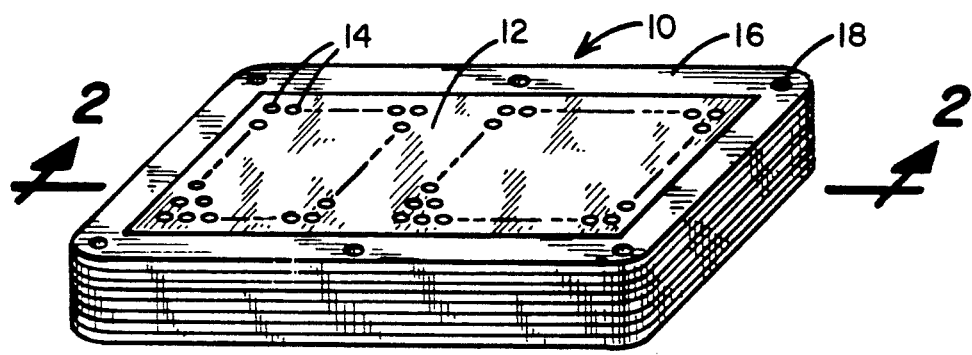
FIG. 1 is a perspective showing a layered structure of a multi-coplanar capacitor system in accordance with the invention.

FIG. 1 represents a perspective view of a multi-layer stacked arrangement of the invention similar to a printed wiring board generally at 10 and including a top blank dielectric layer 12 partially showing a grid pattern of plated through holes 14 in the dielectric layer and a metallic conductive peripheral edge 16 with holes for retaining means as at 18.

Figure 2:
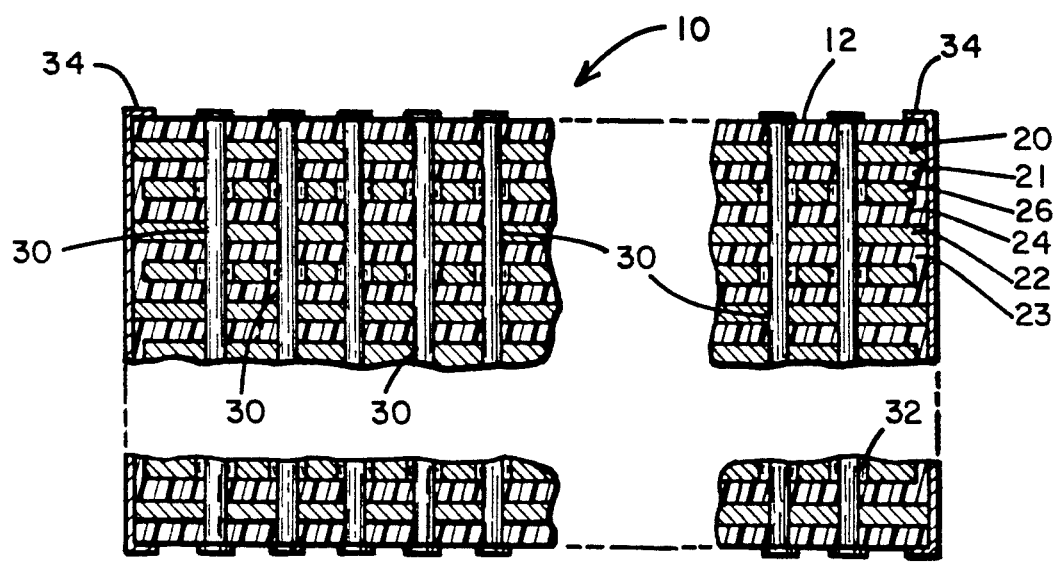
FIG. 2 is a side elevational sectional view of the stack taken along lines 2—2 of FIG. 1 with parts broken away.
Figure 3:
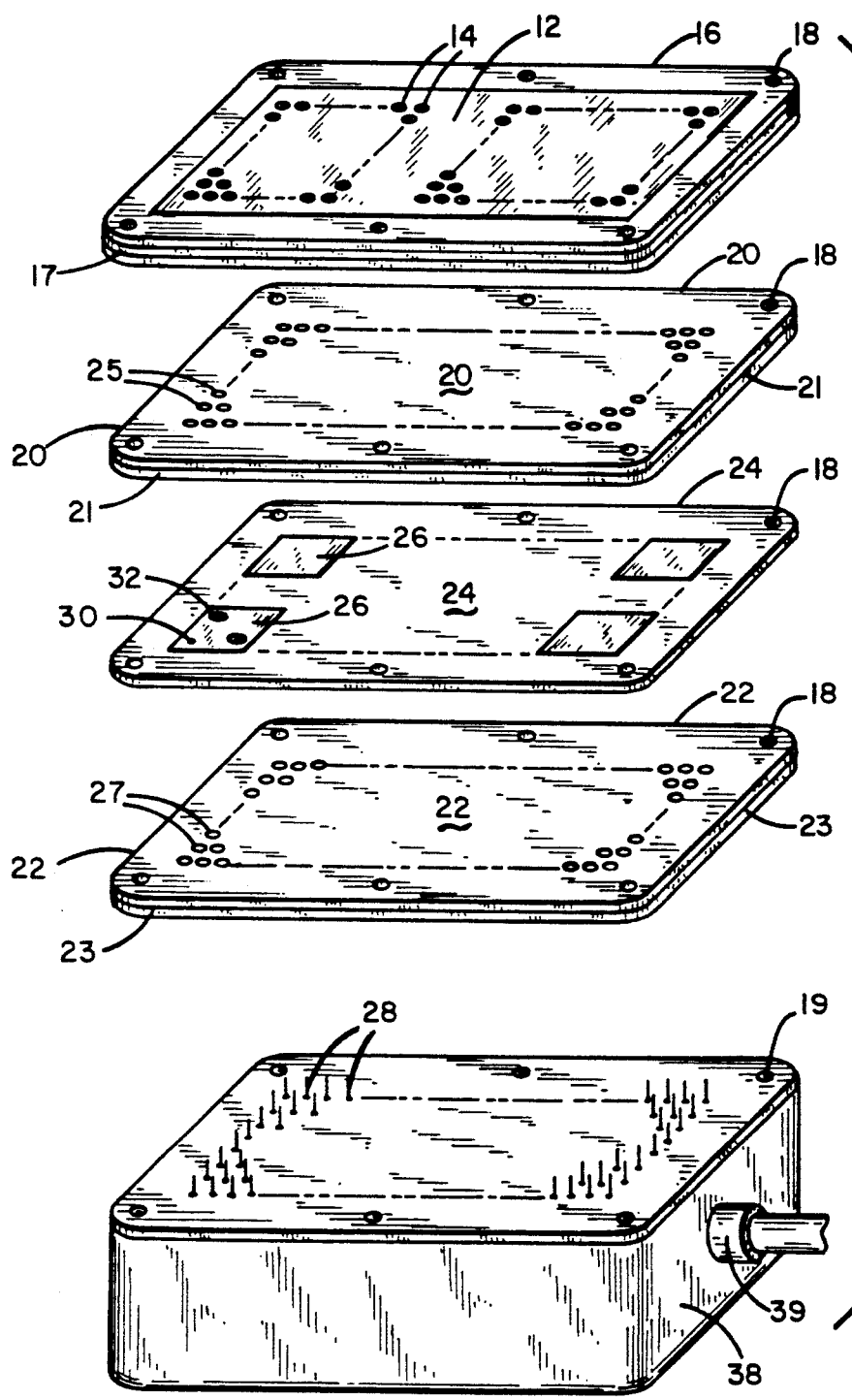
FIG. 3 is a partially exploded view showing the stacking arrangement of FIG. 1 in relation to a connector receptacle module.

As better shown in the partially exploded view of FIG. 3 together with the broken or fragmented side elevational view of FIG. 2, the multi-coplanar capacitance system of the invention includes pairs of metal ground plates or planes as at 20 and 22 flanking and sandwiching a dielectric capacitor layer 24 having a plurality of small isolated capacitance planes as at 26. This forms what is also known collectively as a capacitance plane. Dielectric layers 21 and 23 associated with the ground planes 20 and 22, respectively, separate them from the capacitors as at 26. Each connector pin 28 has an associated isolated unique capacitor plane section at some level to which it is fixed as at 30. The other connector or terminal pins associated with the particular capacitor planes 26 continue through clearance holes as at 32 to be connected each to a separate similar plane 26 on a different level. This is illustrated in the broken side elevational view of FIG. 2 in which only one connection as at 30 occurs for each through hole which represents a single connector pin in the system.

Figure 4:
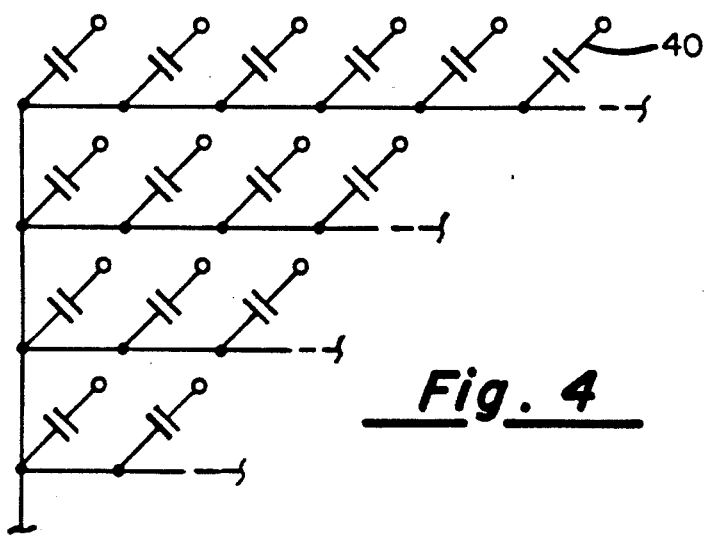
FIG. 4 is a representative schematic diagram of a capacitor array.

The ground planes as at 20 and 22 are preferably copper and are connected together about the peripheral edge of the system as at 34 (FIG. 2) providing a substantial common ground which is tied to the chassis of the system in a well-known manner. The multi-layer system, in this manner, provides an array of capacitors, one associated with each terminal pin of the array as shown schematically at 40 in FIG. 4. The holes 25 in ground layer 20 and 27 in ground layer 22 are clearance holes for the pins in what are otherwise solid metallic ground planes.

A typical connector receptacle housing is shown at 38 in FIG. 3 connected to an input/output cable as at 39. The pins 28 protrude from the rear of the housing 38 as extensions of sockets into which the pins of the compatible plug fit in a well-known manner. The aligned peripheral openings or holes 18 in the layers are used to fasten the laminated PWB structure to the rear of the connector shell 38 through openings 19 which may be threaded to receive screw fasteners or the like. These and other details appear in the above-referenced copending applications and, to the extent such are necessary for an understanding of this application, may be deemed totally incorporated herein by reference from those applications.

The multi-coplanar capacitor (MCC) preferably uses printed wiring board (PWB) materials and processing techniques. It can be anywhere from six layers for the simplest sandwich system to as many layers as the process can accommodate depending on the complexity and size of the pin array arrangement. Of course, it is contemplated that the PWB thickness be balanced against the corresponding pin length and other considerations with respect to processing where necessary. For example, one successful model MCC/PWB consisted of an equivalent of 32 layers including one blank layer.

As indicated above, each relatively small capacitor is formed, then, by placing a capacitor plane layer containing multiple coplanar capacitor planes between two solid metal ground planes in interleaved construction in which the ground planes are provided with an appropriate pattern of clearance holes for the connector pins to pass through. Each ground plane is further extended about the periphery of the dielectric material and all ground planes are connected to a common and substantial chassis ground system which makes the ground common to all the capacitors in the MCC. Furthermore, by using a pair of spaced ground planes for each capacitor plane, the capacitance of the system will double over the utilization of a single ground plane. The ground plane stack configuration also decreases the likelihood of stray coupling between capacitors on different levels.

The MCC provides an individual capacitor associated or connected to each connector or terminal pin having a capacitance plane area that extends beyond the realm of the individual pin. The other pins which pass through the capacitance area are provided with clearance holes such that the non-connected pins may safely pass through to a level at which they are also connected to an unique capacitance plane. In this manner, a pin does not share another pin's capacitance plane area and the MCC provides individual capacitance for each pin on the connector with respect to the ground connection. Of course, if such is desired, multiple pins can be connected together.

As illustrated in the FIGS., the MCC/PWB system of the invention is shown as being external to the connector receptacle housing 38. Of course, PWB manufacturing techniques would allow the system to be made such that it could also be contained within the housing 38 if such were desired. Compensation of the connector shell to accept and accommodate the MCC/PWB is believed to be within the ability of those skilled in the art. As can further be seen from the drawings, the pin pattern and size of the system can be made to accommodate just about any shaped existing multi-pin connector and, because the PWB techniques facilitate generating a new MCC shape readily, this also presents an advantage for use in the technique of the present invention. In this manner, printed wiring board technology allows the PWB to be cut to any desired shape although most connectors are square, rectangular or circular in configuration.

It has been found that an MCC having a small cell-size between capacitance plates produces excellent microwave rejection. In addition, the low impedance ground system also facilitates easy connection and use into the microwave region. Whereas there are many PWB dielectrics one might use to form the capacitance layers exclusive of the capacitance plates 26, one having good high frequency response, low expansion coefficient and reasonable cost such as a cyanate ester is preferred. The type of material may well depend on the particular application of the system.

The MCC is produced very similar to typical PWB construction with generally closer layer distances because of the flat nature of the capacitance planes used and the few voids between the copper ground layers. Sandwiches such as that shown in FIG. 1 have been obtained with as little as one to two rail spacing of the ground layers 20, 22 without any lamination problems. Plated through holes are drilled after the layers are stacked and then plated through.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. A multi-coplanar, multi-layer capacitor array for use as an RFI filter associated with an electrical connector module having a pattern of pin conductor and socket conductor connections, said multi-layer capacitor array comprising:
   (a) multi-layer board structure comprising super imposed layers including:
      (1) ground plane layers and capacitor plane layers interleaved with one another;
      (2) a pattern of continuous apertures formed perpendicular to and extending through the ground plane layers and capacitor layers forming a grid having a center-to-center spacing, said pattern being congruent with a pattern of sockets in the connector module and adapted to receive male conductor pins of a like pattern;
      (3) the ground plane layers further being characterized by a continuous conductive layer having clearance holes surrounding the apertures formed therein so as to be electrical insulated from received male pin conductors, the ground plane layers being jointly connected to a common ground; and
      (4) each of the capacitor plane layers including a plurality of defined coplanar individual separate capacitor areas encompassing an area occupied by a plurality of terminal pins but being electrically connected to one, the rest being provided with clearance holes surrounding the aperture formed therein, the remaining pins being electrically connected each to a separate capacitor on a different, similarly configured level, thereby associating each pin with an unique capacitive plane;
   (b) the separate capacitors providing RFI filtering for any signals on each pin.

2. The apparatus of claim 1 wherein the multi-layer board is constructed in the manner of a printed wiring board.

3. The apparatus of claim 1 wherein the connector module includes a receptacle on a multi-function chassis and the ground planes are connected to the chassis.

4. The apparatus of claim 1 wherein the capacitors are formed on layers of cyanate ester dielectric material.

5. The apparatus of claim 1 wherein the separate capacitor areas are sized and spaced in accordance with the RFI frequencies sought to be suppressed.

6. The apparatus of claim 5 wherein the capacitor size and spacing is designed to reject RFI in the microwave range.

7. The apparatus of claim 1 wherein the capacitor array is attached as an integral part of an electrical connector module, the module being of a type including a connector housing made from a conductive material, the connector housing containing the connector module.

8. The apparatus of claim 1 wherein one or more of the capacitors are connected to a plurality of terminal pins.

9. An electrical connector module comprising:
   (a) a pattern of pin conductor and socket conductor connections;
   (b) a multi-coplanar, multi-layer capacitor array for use as an RFI filter in the form of a multi-layer board structure comprising super-imposed layers further comprising,
      (1) ground plane layers and capacitor plane layers interleaved with one another;
      (2) a pattern of continuous apertures formed perpendicular to and through the ground plane layers and capacitor layers forming a grid having a center-to-center spacing, said pattern being congruent with said pattern of pins and sockets in the connector module and adapted to receive male pin conductors;
      (3) the ground plane layers further being characterized by a continuous conductive layer having clearance holes surrounding the apertures formed therein so as to be electrically insulated from received male pin conductors, the ground plane layers being jointly connected to a common ground; and
      (4) each of the capacitor plane layers including a plurality of defined coplanar individual separate capacitor areas encompassing an area occupied by a plurality of terminal pins but being electrically connected to one, the rest being provided with clearance holes surrounding the aperture formed therein, the remaining pins being electrically connected each to a separate capacitor on a different, similarly configured level, thereby associating each pin with an unique capacitive plane;
   (c) the separate capacitors providing RFI filtering for any signals on each pin.

10. The apparatus of claim 9 further comprising a connector housing made from a conductive material, the connector housing containing the connector module.

11. The apparatus of claim 9 wherein the connector module includes a receptacle on a multi-function chassis and the ground planes are connected to the chassis.

12. The apparatus of claim 9 wherein the separate capacitor areas are sized and spaced in accordance with the RFI frequencies sought to be suppressed.

13. The apparatus of claim 12 wherein the capacitor size and spacing is designed to reject RFI in the microwave range.

* * * * *

UNITED STATES PATENT AND TRADEMARK OFFICE
CERTIFICATE OF CORRECTION

PATENT NO.  : 5 331 505
DATED       : July 19, 1994
INVENTOR(S) : Timothy J. Wilhelm It is certified that error appears in the above-indentified patent and that said Letters Patent is hereby corrected as shown below:

On the title page:

ITEM [75]    inventor is "Timothy J. Wilheim" and should read -- Timothy J. Wilhelm -- .

Signed and Sealed this

Eighteenth Day of October, 1994

Attest:

BRUCE LEHMAN

Attesting Officer        Commissioner of Patents and Trademarks